Jan. 26, 1932.                    O. A. ROSS                    1,843,093
SHUTTER FOR MOTION PICTURE PROJECTION MACHINES
Filed Feb. 19, 1926
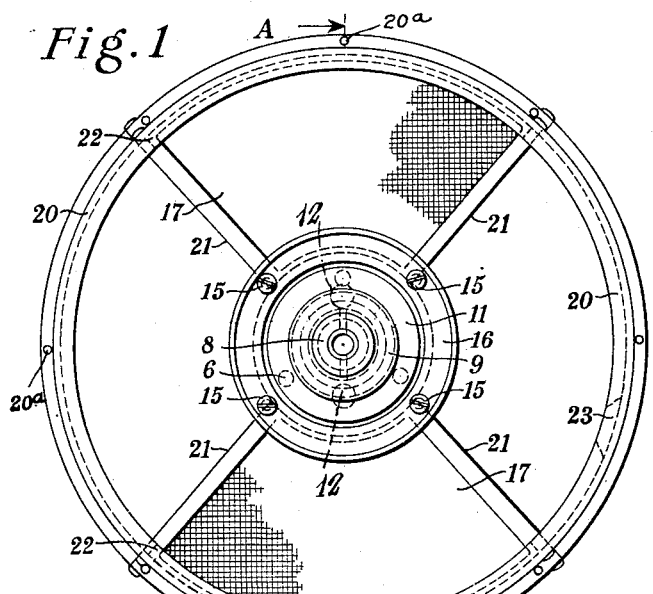
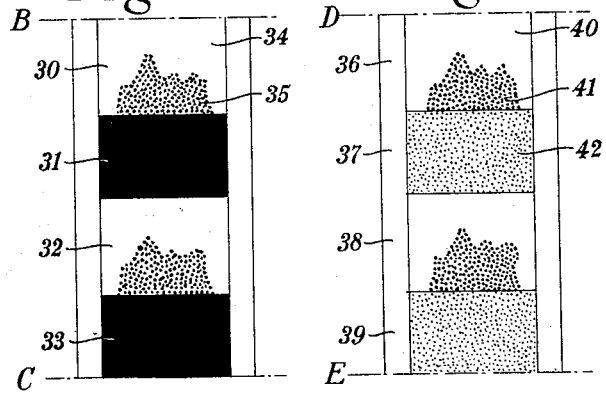
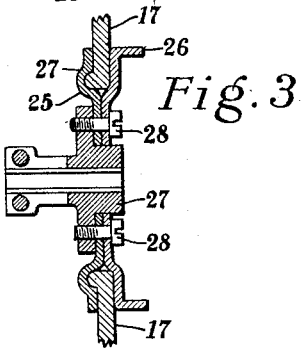
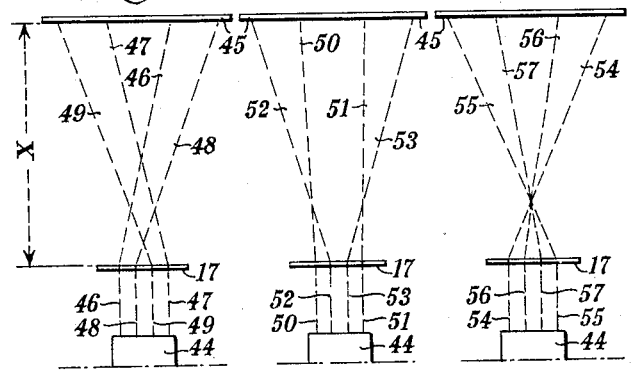
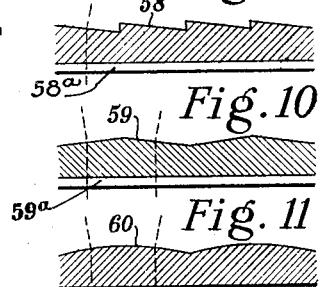
Inventor
Oscar A. Ross Patented Jan. 26, 1932

1,843,093

UNITED STATES PATENT OFFICE

OSCAR A. ROSS, OF NEW YORK, N. Y.

SHUTTER FOR MOTION PICTURE PROJECTION MACHINES

Application filed February 19, 1926. Serial No. 89,363.

This invention relates to shutters, and more particularly to that class of shutters employed on motion picture projection machines.

Known shutters for motion picture projection machines produce a time interval, or period during which the image, or scene on the film is projected onto the screen, or mirror on a stage, and a period, or time interval of darkness, during which no image, or scene is projected onto said screen, or mirror. The period during which the scene, or image is projected, is generally slightly longer than that of the period of darkness.

Assume the interior of any motion picture theater and that a scene of substantially high illuminative density per unit area, is being projected on a screen by a known type of motion picture projection machine, and is being viewed by a spectator, who may be one of an audience numbering one thousand, more or less, persons and that said machine has held the film stationary for a sufficient length of time to permit all the functioning members of said spectator's eye to assume normal adjustment for the scene being projected. The said adjustments will be substantially as follows; the pupils of the eye will dilate or contract to adjust for the intensity of the illumination before the eye, the lenses will flatten, or thicken to adjust for the distance at which sight is focused, the retina will adjust for the varied density and outlines of the scene projected whereby said scene may be transmitted to the brain, or mind of said spectator.

Again assume that after the aforesaid adjustments have taken place, that a period of very low density of illumination per unit area occurs, substantially darkness or semi-darkness, and wherein it is not even possible to see the screen on the stage. The functioning members of the eyes of said spectator are again called upon to adjust for this new condition of illumination, the pupils of the eyes will dilate to permit more light to enter through the lens, the lens will in attempting to penetrate the distance of the darkness and the retina be affected to record darkness to the brain.

Assume that the scene of high illuminative density per unit area has again appeared, perhaps in slightly perceptible altered form. The said spectator's eyes are again called upon for readjustment of the functioning members to substantially the adjustment for the former period of high illuminative density per unit area.

The hereintofore related sequences of adjustments of the functioning members of spectators' eyes is what occur in a more or less minute degree in the eyes of every spectator in the audience of a moving picture theater. Furthermore the rapidity with which the periods of projected scenes and subsequent darkness occur, produces, not only a great strain on the muscles of the eyes, but also a great strain on the nervous system controlling the said muscles, as, said system is of involuntary action controlled by the sub-conscious mind.

The retina of the eyes are also strained for the reason that the mind of the spectator is absorbed in the progressive movement of the image projected on the screen, and, due to the persistence of thought governed by the progression of said image, the brain does not become cognizant of the interval of darkness although it has been impressed upon said retina and probably wholly, or partially transmitted to the said brain.

The complaint of tired eyes after having attended a "movie" is common and it is believed is seriously lowering the standard of eyesight of substantially all participants of motion picture theaters.

One object of this invention is to produce a shutter, which when operated in conjunction with known motion picture projection machines, will relieve the aforesaid eye strains to as great a degree as is possible with the peculiar construction of said machines, and, comprehends means for producing the same intensity of illumination per unit area during the "dark" period as is produced during the "image or scene" period of projection of a movie film, in this manner not calling for a change of adjustment of either the pupils, or lenses, or, on the part of the retina, calling for a distinction of light intensity.

Although the strain on the retina is thereby greatly reduced, it is not entirely eliminated as the high lights and shadows of a scene projected on a movie screen, affect different portions of the retina, whereas during the "dark" period produced by the applicant's improved shutter, the field, although of the same intensity of illumination, is flat having substantially no high lights, or shadows, in other words the intensity of illumination is uniform over the entire area projected upon the screen.

Another object of this invention is to produce a shutter for motion picture projection machines wherein means are furnished to prevent undue strains on the projection apparatus if stopped suddenly, such strains being caused by the stored kinetic energy inherent in a rapidly revolving motion picture shutters having substantial weight.

Another object is to produce a more efficient and economical device of the kind described.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the device, it being understood that, within the scope of what hereinafter thus is claimed, divers changes in the form, proportions, size and minor details of the structure may be made without departing from the spirit of the invention or sacrificing any of its details.

In describing the invention in detail, reference is had to the accompanying drawings, wherein I have illustrated one embodiment of my invention, and, wherein like characters of reference designate corresponding parts throughout the several views, and in which:—

Figure 1, is an elevational view of a preferred form of the improved shutter, and Fig. 2, is a sectional view of the same taken on line A—A of Fig. 1, and Fig. 3, is a modified form of shutter shown in section, and, Fig. 4, is a plan view of a section of movie film represented in intervals of time and effects when employed with known shutters, and Fig. 5, is a similar view when employed with the applicant's improved shutter, and, Figs. 6, 7 and 8, are diagrammatic views illustrating refraction of projected light rays obtained by the applicant's improved shutter, and, Figs. 9, 10 and 11, are sectional views, enlarged, of certain portions of shutter blades which may be employed in the applicant's improved shutter.

Referring to Figs. 1 and 2, hub 1, comprises a split tubular extension 2, adapted, by screws 3—3, to clamp in known manner sleeve 4, and said hub, to the motion picture machine shaft, not shown, also a flange 5, having projections 6—6, adapted to impinge on one side of shutter support 7, also a tubular extension 8, secured to which is collar 9, receiving impingement of one end of spring 10, the other end of said spring acting to force friction plate 11, against the opposite side of shutter support 7. Friction plate 11, is restrained from turning on extension 8 by key 14 rigidly secured thereto, the upper portion of said key being arranged slidably in key-way 14ª of member 8, said member also having convex projections 12—12, adapted to seat in concave recesses 13—13, of shutter support 7.

Secured to shutter support 7, by screws 15—15, and annular member 16, are shutter blades 17—17, preferably of moulded transparent material having a tongue 18, adapted to mate with groove 19 in said shutter support, said blades being further located and secured by the channel ring 29, composed of stamped annular rings 20—20, secured together with rivets 20a, or spot welding. Said ring may be more firmly located by wires 21—21, one end of which is secured to screws 15—15, and the other drawn through said ring and suitably secured to the periphery thereof, as for example by soldering. A suitable resilient packing as 22—22, may be employed to obtain uniform juncture of the parts. After assembly the complete shutter may be mechanically balanced by the addition of a weight, as 23, placed in the channel of ring 20—20.

Referring to Fig. 3, the shutter support 7, of Figs. 1 and 2, has been modified to the form shown by member 25, of Fig. 3, and to which are secured shutter blades 17—17, member 26, suitably secured to member 25 serving to secure said shutter blades to said member and form a composite structure which may be removably secured to hub 27, by screws 28—28.

Shutter blades 17—17 are preferably composed of a transparent material, as for example glass, and the surfaces thereof are prismatic in structure, said prisms being small in area as compared to the total area of the beam of light projected by a motion picture projection machine at the point where it is intercepted by said shutter blades. The angularity of the refracting surfaces of said prisms is preferably such that the refracted rays of light do not fall outside the area of illumination ordinarily projected on a movie screen when the projected beam is not intercepted by the shutter blade and as will be hereinafter more fully described.

Referring to Fig. 4, the distance between the lines B and C, represent, in intervals of time, the movement of two complete cycles of movie film exposure employing well known shutters. The exposure during the time interval 30, is a scene composed of a high light, or back ground substantially white in color, the object 35, as for example a mountain, is gray in color. The composite density of illumination projected on the screen is very high, and is equal to the result obtained if a color screen of very light gray, or brown, were interposed in the path of the beam of light projected by the particular motion picture projection machine in use, it being considered that no film, other than the color screen, aforesaid, is present. The eyes of a spectator viewing said exposure, will, as heretofore related, tend to adjust themselves to the high density of illumination projected onto the screen.

The exposure during time interval 31, the period during which a blade of a known shutter is interrupting the projected beam of light, and during which the movement of film is taking place, is substantially black, or dark, and the intensity of illumination projected onto the screen is nil, and is equivalent to placing an opaque screen in the path of the projected beam of light from said projection machine. The eyes of said spectator, are now called upon to readjust for this abnormal change in density of illumination.

At the lapse of time interval 31, the film exposure represented by time interval 32 appears, substantially of the same high density of illumination as the time interval 30. The eyes of said spectator are again called upon to make an abnormal adjustment of the eye functioning members to meet this new condition, and, at the lapse of time interval 32, another abnormal change is required to adjust for the substantially nil density of illumination during the time interval 33.

Referring to Fig. 5, the distance between lines D and E, represent, in intervals of time, the movement of two complete cycles of movie film exposure projected by a motion picture projection machine equipped with the applicant's improved shutter. The exposure during time interval 36, has a density of illumination projected on the screen substantially the same as time interval 30, of Fig. 4. The succeeding time interval 37, representing the period of time, during which the shutter blade, as 17, of the applicant's improved shutter, is interposed between the screen and the projected beam of light coming through the film, and during which period said film is being moved to the next scene, has a density of illumination projected onto the screen substantially the same as the average density of illumination during time interval 36, however the density is substantially uniform over the entire field of exposure on said screen. For this reason the eye functioning members controlling the pupils and lenses of the spectator's eyes, are not called upon for change, and the only change called for by the functioning members of the retina, is relocation of high lights and shadows, however, as the persistence of vision and mind is engrossed in the progression of the image portrayed on the screen, no mental cognizance is taken of this retinal change.

At the lapse of time interval 37, the exposure represented by time interval 38 appears, also of substantially the same light density as that of interval 37, and, as the persistence of mind and vision are absorbed in the progression of the movie picture, no change in the eye functioning members occurs. The exposure during time intervals 38 and 39, are substantially the same as those of 36 and 37.

It will be apparent, that, irrespective of the predominance of the high or low lights exhibited by a "frame", the light density during a frame exposure will be followed by an exposure of light of the same density passing through the shutter blade except at points on the film where a complete change of scene, or title ensues.

It will be further apparent that motion picture projection machines equipped with the applicant's improved shutter will reduce the strains of the functioning members of spectators' eyes very materially, and it may be said reduces the strains on the entire physical constitution for the reason that medical experts consider that any strain on the nerves of the human system tends to decrease the useful period of life and also hastens death.

Referring to Figs. 6, 7 and 8, which are to be considered as viewing either vertical or horizontal planes of selected projected fractional beams of light, the rays of which portray portions of a scene appearing on a movie film to be projected on the screen 45 after passing through the shutter blade 17. The distance X, representing the distance between the shutter blade 17 and the screen 45, is, for the purpose of illustration made very short, also, and for the same reason, the width and depth of the beam at its source, the projector 44, are shown of large dimension as compared to the area projected on screen 45.

Fig. 6, as an example, is assumed to be a top view taken on a horizontal plane at substantially the top of the projected light beam. Suitable prismatic surfaces of known construction, and as illustrated in Figs. 9, 10 and 11, and any one, of which may be present on blades 17, at the selected locations through which beams 46, 47, 48 and 49 pass, will refract the particular fractional beams of projected light, substantially as shown. The exterior beams 46 and 47 will be considered as of low light intensity, thereby producing a low density of illumination on screen 45. The rays 48 and 49 will be considered to be of high light intensity thereby producing an area of high density of illumination on said screen. The beams 46 and 47 would ordinarily pass to the adjacent sides, or edges of screen 45, however, with the shutter blade 17, interposed there between, they not only pass to the adjacent center of said screen, but also cross to the opposite sides thereof. The beams 48 and 49 which would ordinarily have been projected to the adjacent center, are refracted by blade 17, and projected to the adjacent edge of said screen.

Referring to Fig. 7, which it is assumed represents a location, also in a horizontal plane, and, slightly below that illustrated in Fig. 6, the distance being a small fraction of the entire distance across the two parallel sides of the beam, the two outside beams 50 and 51, are refracted by shutter blade 17 to project said beams to the adjacent center of screen 45, without crossing. The inside beams 52 and 53, are refracted to pass to the adjacent edges of said screen without crossing. Further assuming that the light intensity of the last named beams to be relatively opposite to that of the beams shown in Fig. 6, the beams of light projected to the adjacent center of screen 45 will produce a low density of illumination, whereas the beams projected to the adjacent edge will produce a high density of illumination on said screen.

Referring to Fig. 8, in which the location is also assumed to be in a horizontal plane, and also a slight distance below that illustrated in Fig. 7, all the selected fractional beams of projected light are refracted to cross each other, and, assuming further that the light intensity of said beams are substantially the same as those of Fig. 6, the exterior beams 54 and 55, will produce a low density of illuminated area adjacent the edges, whereas the interior beams 56 and 57, will produce a high density of illumination at the adjacent center of said screen.

It will be apparent that a group of low intensity light rays passing through a low light area of a "frame", and which would ordinarily be deposited on a screen as a fixed area of low illumination, is split up into a substantially large number of beams of low intensity light which are projected onto the screen at substantially uniformly spaced distances, interposed between which are similar beams of light of high intensity eminating from the light rays passing through the high light area of the frame.

It is to be understood that the fractional beams of projected light 46 to 57 inclusive, are only a portion of all the light rays in the particular plane referred to, and that the aforesaid refractions occur in all the subdivided areas in vertical as well as horizontal planes, the preferred object, at any one instant, being to produce substantially a checker board effect as the image projected on said screen, the squares, or other shaped areas of which will be so small, that, considering the rapidity with which they are transposed in location, the effect upon a spectator's eyes will be that of viewing an imageless surface having a density of illumination per unit area equal to the average density of illumination of the previous scene on said film, and which was not intercepted by the applicant's improved shutter during the regular period of exposure.

Whereas it is preferred to employ a clear, or transparent material for the shutter blades, as 17, I have found that translucent materials may also be effectively employed, and that certain shades of opalescent and iridescent materials may be employed without the use of prismatic surfaces, and that such shutter blades are a substantial improvement over the opaque blades employed in known shutters. However as the light absorption by the translucent, or iridescent material is high as compared with the transparent materials, it is preferred to employ the latter in combination with prismatic surfaces as described.

Although there is some loss of illuminative intensity of the entire projected beam due to some light absorption of a transparent material, this loss is compensated for by the additional light projected through the area forming the bar of space between each frame, or scene on the film as said bar passes through the projected light area when movement of the film takes place, such movement occurring when the shutter blade as 17, is interposed in the said projected beam.

Referring to Figs. 9, 10 and 11, Fig. 9, represents a substantially enlarged section of a selected portion of the shutter 17, the prisms 58 and 58a, of which are exaggerated as to size and angularity for the purpose of illustration. These prisms are preferably arranged in rows, the rows of one face being arranged preferably at right angles, though not necessarily so, to the opposite face, forming substantially a checker board effect. If desired, prisms, as 59 and 59a of Fig. 10, or convex lens surfaces as 60, of Fig. 11, may be employed.

Referring to Figs. 1 and 2, under ordinary operation of the shutter, the projections 12—12 register with the recesses 13—13. Should for any reason, the shaft supporting said shutter be stopped abruptly while operating at ordinary speed, the inertia of the rotating parts supported by the shutter support 7, will cause said support to rotate with respect to hub 1, thereby forcing projections 12—12 out of engagement with recesses 13—13, and friction plate 11 will move to the right. Due to the high rotative speed of said support and its depending parts, projections 12—12 will be restrained from fully entering said recesses, however, slight entry will take place acting as a brake to stop said rotation. After rotation has been reduced a predetermined amount, said projections will positively seat in said recesses and prevent further rotation of said support on said hub.

Whereas the projections 12—12 and recesses 13—13, are shown as three each in number, they may be reduced to two each in number, and arranged in a diametrical plane, in this manner insuring that the blades 17—17 would always be stopped at the correct circumferential location for intercepting the projected beam of light at the proper time.

The projections 6—6 act to reduce the friction between shutter support 7 and hub 1 during the periods that projections 12—12 are dis-engaged from recesses 13—13, whereby said projections are assured of entering said recesses before rotation ceases even though said rotation may be substantially slow.

It is obvious that if desired the projections 12—12 may be made part of the support 7, and the recesses 13—13 may be carried by the friction plate 11. Also that the projections 6—6, may be made a part of said support and omitted from the flange 5.

What I claim is:—

1. A shutter for motion picture projectors comprising, obscuration blades formed of transparent material, a series of lineal parallelly disposed prisms formed on one face thereof, a series of similarly formed prisms formed on the opposite face of the blades, the rows of prisms being angularly disposed lineally with respect to the rows of prisms of the first named face, the faces of the prisms of both faces having a comparatively small angle of incidence with respect to the plane of travel of the blades, and a hub member for supporting the blades to form the shutter.

2. A shutter for motion picture projectors comprising, a hub member, a flange portion formed thereon, a flange member supported by the hub member arranged to have co-axial movement thereon but constrained to rotate therewith, a shutter blade supporting member supported by the hub member positioned between the flange portion and the flange member, and resilient means supported by the hub member for restraining axial movement of the flange member whereby the shutter blade supporting member is clampably allocated between the flange portion and the flange member.

3. A shutter for motion picture projectors comprising, a hub member, a flange portion formed thereon, a flange member supported by the hub member arranged to have co-axial movement thereon but constrained to rotate therewith, a shutter blade supporting member supported by the hub member positioned between the flange portion and the flange member, resilient means supported by the hub member for restraining axial movement of the flange member whereby the shutter blade supporting member is clampably allocated between the flange portion and the flange member, and registering means correlatively supported by the flange member and the shutter blade supporting member for frictionally permitting rotation of the shutter blade supporting member with respect to the hub member arranged to registeringly allocate the members in predetermined relative radial planes.

4. In combination with a motion picture projector for projecting motion pictures onto a screen, of a motion picture shutter comprising, obscuration blades formed of transparent material, a series of lineal parallelly disposed prisms formed on one face thereof, a series of similarly formed prisms formed on the opposite face of the blades, the last named rows of prisms being angularly disposed with respect to the rows of the first named prisms, the faces of the prisms of both the faces having a comparatively small angle of incidence with respect to the plane of travel of the blades whereby the beams of light refracted by the prisms will be mal-pictorially projected onto the screen substantially within the frames margins of the normally projected motion picture frames.

5. A shutter for motion picture projectors comprising, obscuration blades formed of transparent material, a plurality of rows of lineal prisms formed on one face thereof arranged to refract the light beam projected by the projector, a plurality of similar rows of prisms formed on the opposite face, the rows of one face being positioned substantially at right angles to the rows of the opposite face, the angle of incidence of the faces of the prisms being comparatively small with respect to the plane of travel of the blades, and a hub member arranged to support the blades to form the shutter.

6. A motion picture shutter comprising, a hub member arranged to be secured to a projector shaft for rotatively supporting the shutter, a shutter member having an annular portion surrounding a centrally disposed orifice therein, frictional faces formed thereon, frictional faces formed on the hub member frictionally engaging the frictional faces of the shutter member for frictionally rotatively supporting the shutter member by the hub member, the frictional faces of the shutter member and hub member having a comparatively small frictional resistance one to the other, mating portions formed on the frictional faces of the hub and shutter members for frictionally allocating the shutter member predeterminately radially with respect to the hub member, the frictional resistance of the mating portions being comparatively high whereupon rotation of one of the members relatively to the other, the members will be frictionally arrested by mating engagement of the mating portions for properly allocating the shutter member radially with respect to the hub member.

7. A motion picture shutter comprising, a hub member, a shutter member frictionally supported thereby having obscuration blades arranged to cut off the light beam of the projector at predetermined intervals, and frictional arresting means mutually associated with the members arranged to frictionally arrest the rotation of the shutter member on the hub member at predetermined relative radial planes thereof whereby upon inadvertent frictional rotation of the shutter member relatively to the hub member the shutter member will be arrested to normally cut off the light beam projected by the projector.

8. A motion picture shutter comprising, a hub member having an annular portion formed with a flat frictional face, and an annular member slidably supported by the hub member having a flat frictional face formed thereon facing the frictional face of the hub member, a shutter member having an annular portion surrounding a centrally disposed orifice the annular portion having flat frictional faces arranged to be frictionally engaged between the faces of the hub and annular member for frictionally rotatively supporting the shutter member on the hub member, and frictionally engaged mating portions formed on certain of the frictional faces arranged to arrest the relative rotation of the hub and shutter members at predetermined relative radial planes thereof.

9. A motion picture shutter comprising, a hub member arranged to be secured to a projector shaft for rotatively supporting the shutter, an annular portion formed adjacent one end thereof having a frictional face formed inwardly thereof, an annular member slidably supported by the hub member having a frictional face formed thereon facing the frictional face formed on the annular portion of the hub member, a shutter member having an annular portion formed thereon surrounding a centrally disposed orifice, the annular portion being positioned between the annular portion of the hub member and the annular member, frictional faces formed on the annular portion of the shutter member arranged to frictionally engage the frictional faces of the hub and annular members, frictional mating arresting portions formed on certain of the relatively rotatable frictional faces arranged to frictionally arrest the relative rotation of the hub and shutter members at predetermined radial planes thereof, and means resiliently constraining the annular member into frictional engagement with the annular portion of the shutter member.

Signed at New York City, in the county of New York and State of New York, this 17th day of February, A. D. 1926.

OSCAR A. ROSS.